US012782606B2

(12) United States Patent
Bingel et al.

(10) Patent No.: US 12,782,606 B2
(45) Date of Patent: Nov. 3, 2026

(54) REFLECTION-REDUCING LAYER SYSTEM WITH AN ELECTRICALLY CONDUCTIVE SURFACE AND METHOD FOR PRODUCING A REFLECTION-REDUCING LAYER SYSTEM

(71) Applicant: Fraunhofer-Gesellschaft zur Förderung der angewandten Forschung e. V., Munich (DE)

(72) Inventors: Astrid Bingel, Jena (DE); Ulrike Schulz, Jena (DE); Anne Gärtner, Jena (DE); Friedrich Rickelt, Jena (DE); Peter Munzert, Jena (DE); Sven Schröder, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 280 days.

(21) Appl. No.: 18/446,232

(22) Filed: Aug. 8, 2023

(65) Prior Publication Data

US 2024/0061153 A1 Feb. 22, 2024

(30) Foreign Application Priority Data

Aug. 18, 2022 (DE) ......................... 102022120892.3

(51) Int. Cl.
*G02B 1/118* (2015.01)
*G02B 1/111* (2015.01)

(52) U.S. Cl.
CPC .............. *G02B 1/111* (2013.01); *G02B 1/118* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| 6,441,964 | B1 | 8/2002 | Chu |
| 6,852,406 | B2 | 2/2005 | Marechal |
| 8,007,901 | B2 | 8/2011 | Beinat |
| 8,591,026 | B2 | 11/2013 | Conte |
| 9,039,906 | B2 | 5/2015 | Schulz |
| 9,586,816 | B2 | 3/2017 | Bhatia |
| 10,782,451 | B2 | 9/2020 | Schulz |

(Continued)

FOREIGN PATENT DOCUMENTS

| | | | |
|---|---|---|---|
| DE | 19752889 | C1 | 6/1999 |
| DE | 102010012044 | A1 | 9/2011 |

(Continued)

OTHER PUBLICATIONS

Hossain, I. et al., "Nanostructured front electrodes for perovskite/c-Si tandem photovoltaics," Opitics Express, vol. 28, No. 6, Mar. 2020, 20 pages.

(Continued)

*Primary Examiner* — Carl Adams
(74) *Attorney, Agent, or Firm* — Slater Matsil, LLP

(57) ABSTRACT

In an embodiment a reflection-reducing layer system is arranged on a substrate, wherein a surface of the reflection-reducing layer system facing away from the substrate is electrically conductive, and wherein a nanostructure comprising a plurality of pillars arranged side by side is arranged between the substrate and the surface.

14 Claims, 13 Drawing Sheets

(56) References Cited

U.S. PATENT DOCUMENTS

| | | | | |
|---|---|---|---|---|
| 2008/0176038 | A1* | 7/2008 | Zhang | G02B 1/02<br>428/141 |
| 2009/0261063 | A1 | 10/2009 | Munzert | |
| 2018/0355467 | A1* | 12/2018 | Lee | B32B 15/08 |
| 2020/0081160 | A1 | 3/2020 | Schulz | |
| 2021/0263195 | A1 | 8/2021 | Trottier-Lapointe | |
| 2022/0018993 | A1 | 1/2022 | Schulz | |
| 2022/0363915 | A1 | 11/2022 | Schulz | |
| 2023/0161170 | A1* | 5/2023 | Ye | G02B 5/3058<br>359/485.05 |

FOREIGN PATENT DOCUMENTS

| | | | |
|---|---|---|---|
| DE | 102012105457 | B3 | 9/2013 |
| DE | 102013106392 | A1 | 12/2014 |
| DE | 102016125197 | A1 | 6/2018 |
| DE | 102020118959 | A1 | 1/2022 |
| DE | 102021112288 | A1 | 11/2022 |
| WO | 2007071723 | A2 | 6/2007 |

OTHER PUBLICATIONS

Khan, H. et al., "Nanostructured as-deposited indium tin oxide thin films for broadband antireflection and light mapping," Nanotechnology, Open Access, Jul. 18, 2017, 10 pages.

Paetzold, U. et al., "Nanophotonic front electrodes for pervoskite soloar cells," Applied Physics Letters, Apr. 27, 2015, 6 pages.

Sittinger, V. et al., "ZnO:A1 films deposited by in-line reactive AC magnetron sputtering for a-Si:H thin film solar cells," Thin Solid Films, Science Direct, Feb. 1, 2006, 10 pages.

* cited by examiner

REFLECTION-REDUCING LAYER SYSTEM WITH AN ELECTRICALLY CONDUCTIVE SURFACE AND METHOD FOR PRODUCING A REFLECTION-REDUCING LAYER SYSTEM

CROSS-REFERENCE TO RELATED APPLICATIONS

This patent application claims the priority of German patent application 10 2022 120 892.3, filed Aug. 18, 2022, the disclosure content of which is hereby incorporated by reference.

TECHNICAL FIELD

The present application relates to a reflection-reducing layer system with an electrically conductive surface and a method for producing a reflection-reducing layer system.

BACKGROUND

To achieve reflection-reducing properties of transparent components, coatings based on interference filters are used in optical systems, for example, for which oxide layers with different refractive indices can be deposited on top of each other. However, such coatings do not provide any shielding against static or low-frequency electric fields.

SUMMARY

Embodiments provide a layer system that is characterized by reflection-reducing properties with simultaneously high transmission and is suitable for shielding against static or low-frequency electric fields. Further embodiments provide a method with which a reflection-reducing layer system can be produced simply and reliably.

Embodiments provide a reflection-reducing layer system.

According to at least one embodiment of the reflection-reducing layer system, the reflection-reducing layer system is arranged on a substrate.

The term "substrate" generally refers to an element that is to be provided with a reflection-reducing coating. For example, the substrate is transparent or partially transparent. For example, the substrate has a transmission of at least 70% or of at least 80% in a target wavelength range of the reflection reducing coating. For example, the substrate is a glass substrate or a plastic substrate. For example, the substrate is an optical or optoelectronic component or part thereof, or a precursor to an optical or optoelectronic component to be produced.

According to at least one embodiment of the reflection-reducing layer system, a surface of the reflection-reducing layer system facing away from the substrate is electrically conductive. In particular, the electrically conductive surface terminates the reflection-reducing layer system as viewed in a vertical direction, i.e. perpendicular to a main surface of the substrate. The surface forms an interface with an ambient medium, for example a gas such as air. The reflection-reducing layer system thus provides an exposed electrically conductive surface accessible for external electrical contacting.

According to at least one embodiment of the reflection-reducing layer system, a nanostructure with a plurality of pillars arranged side by side is arranged between the substrate and the surface. The nanostructure can provide an antireflection property on its own or in combination with further components of the layer system, in particular in combination with further layers arranged on and/or under the nanostructure.

In at least one embodiment of the reflection-reducing layer system, the layer system is arranged on a substrate, wherein a surface of the layer system facing away from the substrate is electrically conductive and a nanostructure having a plurality of pillars arranged side by side is arranged between the substrate and the surface.

By means of the nanostructure, an effective refractive index can be achieved which is significantly lower than the refractive index of a homogeneous layer of the same material. The reflection at the surface of the layer system can thus be specifically adjusted, for example with regard to a spectrally broadband antireflection property and/or a good antireflection property over a large angular range. If appropriate, this can be done in conjunction with further layers between the substrate and the nanostructure. Furthermore, the layer system provides an electrically conductive surface which is accessible for external electrical contacting. For example, the electrically conductive surface can be connected to a ground potential. The layer system thus combines an antireflective property with the possibility of achieving shielding against static or low-frequency electric fields. Furthermore, the layer system can be characterized by a high transmission. For example, the transmission in a target wavelength range is at least 80% or at least 90%. In particular, the total transmission through the reflection reducing layer system and the substrate may be greater than or equal to the transmission through the substrate without the reflection reducing layer system. Thus, the reflection-reducing layer system may be transmission enhancing or at least transmission maintaining for the substrate.

According to at least one embodiment of the reflection-reducing layer system, an electrically conductive layer is arranged between the substrate and the nanostructure. The electrically conductive layer is, for example, a homogeneous, unstructured layer. For example, the nanostructure is immediately adjacent to the electrically conductive layer. In other words, viewed from the nanostructure in the direction of the substrate, at least the layer closest to it is electrically conductive. Other layers closer to the substrate, if any, may also be electrically insulating. For example, in gaps between the pillars, a layer forming the surface of the reflection-reducing layer system is electrically conductively connected to the underlying homogeneous electrically conductive layer directly or via an intermediate layer.

For example, the electrically conductive layer has a thickness of at most 400 nm or at most 200 nm or at most 100 nm or at most 50 nm and/or at least 5 nm or at least 10 nm. The thickness of the electrically conductive layer can also be selected, in particular, with regard to an optical layer thickness that is favorable for the reflection-reducing property of the layer system.

According to at least one embodiment of the reflection-reducing layer system, the electrically conductive layer is electrically conductively connected to the surface of the layer system. Via the electrically conductive layer, the electrical conductivity can be increased parallel to the surface of the layer system. Electrically insulating material can be arranged between the electrically conductive layer and the surface. In this case, the electrically insulating material is expediently present only in places so that there is electrical contact between the electrically conductive layer and the surface.

The material at the surface of the layer system and/or the electrically conductive layer comprise, for example, a transparent, electrically conductive oxide. Transparent, electrically conductive oxides (TCO) are transparent, electrically conductive materials, usually metal oxides, for example based on indium tin oxide (ITO), zinc oxide, tin oxide or gallium oxide ($Ga_2O_3$). In addition to binary metal oxygen compounds, such as ZnO, $SnO_2$ or $In_2O_3$ also include ternary metal oxygen compounds, such as $Zn_2SnO_4$, $CdSnO_3$, $ZnSnO_3$, $MgIn_2O_4$, $GaInO_3$, $Zn_2In_2O_5$ or $In_4Sn_3O_{12}$ or mixtures of different transparent conductive oxides belong to the group of TCOs. Furthermore, it may be possible that the TCOs do not necessarily correspond to a stoichiometric composition and may also be p- or n-doped.

The aforementioned TCO materials are also suitable for further structured, in particular nanostructured or unstructured layers of the reflection-reducing layer system, if appropriate.

According to at least one embodiment of the reflection-reducing layer system, at least some of the pillars have cavities. A lateral extent of the cavities is, for example, more than 10 nm for at least some of the pillars. The cavities may be at least partially completely enclosed. By means of the cavities, a particularly low refractive index can be achieved for the nanostructure.

According to at least one embodiment of the reflection-reducing layer system, the pillars are stochastically randomly distributed over the substrate and/or, at least for some pillars, a center-to-center distance to the closest pillar is between 50 nm and 100 nm, inclusive. During the fabrication of the nanostructure, the formation of the pillars is in particular self-organized. Spaces between adjacent pillars have, at least at some locations, for example, a lateral extent of at least 5 nm or at least 10 nm and/or of at most 60 nm or at most 40 nm. A maximum lateral extent of the pillars is, for example, at least 20 nm and/or at most 60 nm. The respective axes of the pillars may be oblique or perpendicular to the surface of the substrate.

According to at least one embodiment of the reflection-reducing layer system, the pillars have a height-to-width ratio of at least 1.0 or at least 1.5 or at least 2. A height of the pillars, i.e. an extension perpendicular to the surface, is preferably between 40 nm and 300 nm inclusive, particularly preferably between 70 nm and 200 nm inclusive. With a nanostructure having such a height-to-width ratio, scattering losses can be efficiently avoided so that high transmission is achievable.

According to at least one embodiment of the reflection-reducing layer system, the nanostructure has an effective refractive index of at most 1.7 or at most 1.6 or at most 1.3. Alternatively or complementarily, the effective refractive index is, for example, at least 1.05 or at least 1.1. In particular, the effective refractive index of the nanostructure is smaller than the refractive index of the electrically conductive layer, if present, between the substrate and the nanostructure.

According to at least one embodiment of the reflection reducing layer system, a further nanostructure is arranged between the substrate and the nanostructure. For example, the further nanostructure has a higher effective refractive index than the nanostructure. The reflection-reducing property can thus be further promoted. The further nanostructure may be produced largely analogous to the nanostructure or by a different process.

According to at least one embodiment of the reflection reducing layer system, an interference layer sequence is arranged between the substrate and the nanostructure. By combining the nanostructure with the interference layer sequence, the reflection-reducing properties can be adjusted to predetermined requirements with respect to the wavelength range and/or the angular range and/or with respect to the refractive index of the substrate. In particular, the nanostructure can be produced with precisely adjustable layer thickness and effective refractive index, which makes it possible to combine an interference layer sequence with the nanostructure and thus achieve, for example, a particularly broadband antireflection coating.

Furthermore, a method for producing a reflection-reducing layer system is disclosed. The method is particularly suitable for the production of the reflection-reducing layer system described above. Features specified in connection with the reflection-reducing layer system can therefore also be used for the method, and vice versa.

According to at least one embodiment of the method for producing a layer system, the method comprises a step of providing a substrate.

According to at least one embodiment of the method for producing a layer system, the method comprises a step of forming a nanostructure having a plurality of pillars arranged side by side on the substrate.

According to at least one embodiment of the method, a surface of the formed layer system facing away from the substrate is formed electrically conductive. The surface of the layer system can be formed during the formation of the nanostructure or can be formed by an electrically conductive cover layer applied in particular directly to the nanostructure.

In at least one embodiment of the method, a substrate is provided and a nanostructure having a plurality of pillars arranged side by side is formed on the substrate, wherein a surface of the formed layer system facing away from the substrate is electrically conductive.

With the method described, a substrate can be provided in a simple and reliable manner with a layer structure that can offer reflection-reducing properties and high transmission on the one hand and the possibility of shielding from static or low-frequency electric fields on the other hand. Furthermore, the method is compatible with conventional manufacturing processes of optical layer systems.

Before forming the nanostructure, an electrically conductive layer is preferably deposited on the substrate.

The formation of the electrically conductive layer and/or the deposition of electrically conductive material on the nanostructure can be carried out by evaporation, for example. This can involve bombardment with noble gas ions. This promotes layer formation at lower temperatures. This is described in the document DE 19752889 C1, the disclosure content of which is hereby explicitly incorporated by reference. Alternatively, other processes can be used, for example sputtering or atomic layer deposition.

According to at least one embodiment of the method, forming the nanostructure comprises forming a nanostructured layer on the substrate. In particular, the nanostructured layer may be formed directly on the electrically conductive layer.

According to at least one embodiment of the method, the nanostructured layer comprises an organic or partially organic material.

The nanostructured layer can be formed, for example, by a plasma process in which an initial layer is first deposited and subsequently ablated in places so that a pillar-like structure is formed. The initial layer can, for example, be applied as a polymer or vapor-deposited as another organic compound.

According to at least one embodiment of the method, the nanostructured layer contains at least one ring-shaped grouping with conjugated nitrogen and carbon atoms. In particular, the nanostructured layer is vacuum-deposited and has, for example, a thickness between 80 nm and woo nm, inclusive. Preferably, the organic material for the nanostructured layer has a molecular structure derivable from purine, pyrimidine or triazine.

Particularly suitable organic materials are those with conjugated C═N groups and derivatives thereof. For example, a suitable material is one from the class of triazines, for example TIC (1,3,5-triallyl-1,3,5-triazine-2,4,6(1H, 3H,5H)-triones), acetoguanamine (6-methyl-1,3,5-triazine-2,4-diamine), Melamine (2,4,6-triamino-1,3,5-triazine), cyanuric acid (3,5-triazine-2,4,6-triol,2,4,6-trihydroxy-1,3,5-triazines), of purines, such as xanthine (2,6-dihydroxypurine), adenine (7H-purine-6-amine), guanine (2-amino-3,7-dihydropurine-6-one), of pyrimidines, for example uracil (1H-pyrimidine-2,4-dione) or UEE (uracil-5-carboxylic acid ethyl ester), of the imidazoles, for example creatinine (2-amino-1-methyl-2-imidazolin-4-one) or of phenylamines, for example NPB (N,N-di(naphth-1-yl)-N,N'-diphenyl-benzidine), TPB (N,N,N',N'-tetraphenylbenzidine) or TCTA (tris(4-carbazoyl-9-ylphenyl)amine).

Among the class of polymers, acrylates such as polymethyl acrylate (PMMA) or photoresists containing epoxy compounds or acrylates are suitable, for example.

According to at least one embodiment of the method, forming the nanostructure comprises overlaying the nanostructured layer with a layer. The layer is in particular an inorganic layer. The layer may be electrically conductive or electrically insulating.

The deposition of the nanostructure layer, in particular the inorganic layer, can be carried out in such a way that it replicates the structure of the nanostructured layer. In this case, the deposited thickness on the flanks of the pillars and/or between adjacent pillars can also be much thinner than on the tips of the pillars. If the layer is deposited by physical vapor deposition such as vapor deposition or sputtering, it covers the largely perpendicular structures with varying thickness, depending on the angle of the impinging particles. Deviating from this, the coverage can also be conformal, for example by atomic layer deposition. In this case, however, its total thickness is typically limited to a few nanometers.

Advantageously, the thickness of the layer is between 5 nm and 100 nm inclusive, particularly preferably between 15 nm and 80 nm inclusive.

According to at least one embodiment of the method, forming the nanostructure comprises performing a post-treatment in which the nanostructured layer is at least locally decomposed or removed. In other words, the post-treatment completely or partially dissolves out organic components.

The post-treatment involves, for example, a plasma etching process in which a basic shape of the previously formed nanostructure is retained. The geometry and/or the height-to-width ratio of the pillars of the nanostructure thus do not change, or at least not significantly, as a result of the post-treatment.

Alternatively or complementarily, the post-treatment can also be carried out by thermal treatment, for example at a temperature above 70° C.

In particular, the organic components of the nanostructured layer can be completely or at least almost completely removed by the post-treatment. It has turned out that an organic material is particularly suitable as an initial material for the nanostructured layer, even if the layer system to be produced is formed completely or at least almost completely by inorganic material.

According to at least one embodiment of the method, the layer deposited prior to post-treatment is electrically conductive. In particular, the entire material deposited on the nanostructured layer may be electrically conductive. A low electrical resistance can thus be achieved in a simplified manner.

According to at least one embodiment of the method, an electrically conductive cover layer is applied after the post-treatment, wherein the electrically conductive cover layer forms the electrically conductive surface of the layer system to be produced.

The nanostructure fabrication steps can also be performed repeatedly to achieve stacked nanostructures.

Preferably, at least the formation of the nanostructure and the subsequent steps in which coating of the substrate takes place are carried out in a plant in a closed vacuum process. The production of the layer system can thus be carried out particularly efficiently. In particular, all steps in which deposition, structuring or post-treatment takes place can also be carried out in one plant.

Furthermore, the reflection-reducing layer system can be realized in a technically reliable manner using conventional vacuum technology. This also makes the method particularly suitable for mass production.

The layer system and the method are generally suitable for optical components, such as those made of glass or plastic, in particular for lenses, lens arrays, optical windows, miniaturized plastic lenses or micro-optical components or parts thereof, or also for optoelectronic components or parts thereof.

For example, the optical or optoelectronic components can be used for optical lenses, objectives, cameras, for displays or display covers, for indicators, for illumination optics, for shielding windows, for heating elements, for windows for electromagnetic field control, for solar cell technology, for display technology, for windows of cathode ray tubes (CRT for short) or for quantum cells.

The figures are each schematic representations and therefore not necessarily to scale. Rather, various elements, in particular layer thicknesses, may be shown exaggeratedly large for improved representability and/or better understanding.

Identical, similar or similarly acting elements are given the same reference signs in the figures.

DETAILED DESCRIPTION OF ILLUSTRATIVE EMBODIMENTS

Figure 1A:
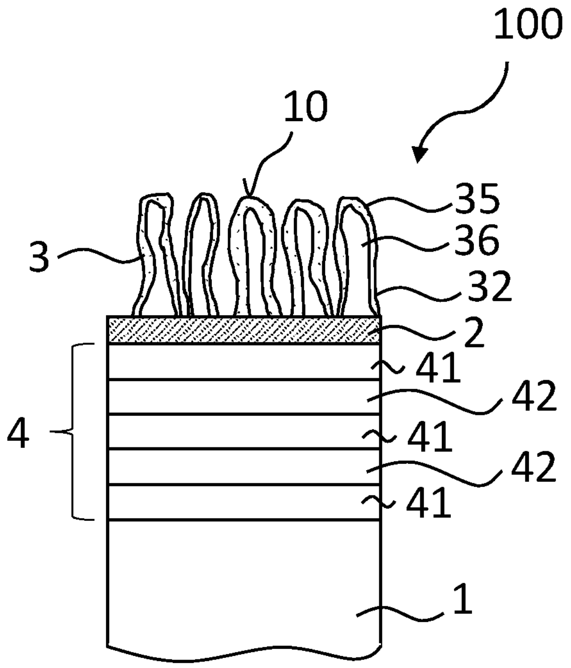
FIG. 1A shows an exemplary embodiment of a reflection-reducing layer system in schematic sectional view.

In the exemplary embodiment of a reflection-reducing layer system shown in FIG. 1A, the reflection-reducing layer system 100 is arranged on a substrate 1, a surface 10 of the layer system facing away from the substrate 1 being electrically conductive. A nanostructure 3 comprising a plurality of pillars 35 arranged side by side is arranged between the substrate 1 and the surface 10 of the layer system 100. The surface 10 is formed by a layer 32, the layer 32 being radiation-transmissive and electrically conductive in the visible spectral range. For example, the layer 32 contains or consists of a TCO material. An electrically conductive layer 2 is disposed between the substrate 1 and the nanostructure 3. In gaps between the pillars 35, the electrically conductive layer 2 is electrically conductively connected to the layer 32 forming the surface 10. The pillars 35 have cavities 36 at least in places. In particular, the cavities 36 may be completely enclosed by electrically conductive material, in the exemplary embodiment shown by the layer 32 and the electrically conductive layer 2. The electrically conductive layer 2 itself is preferably unstructured.

The reflection-reducing layer system 100 thus provides an externally accessible electrically conductive layer on the surface 10 of the reflection-reducing layer system facing away from the substrate 1. This layer can, for example, be electrically conductively connected to a ground potential and thus be used for shielding against electrostatic or low-frequency electric fields.

The pillars 35 are stochastically randomly distributed over the substrate 1 and, for at least some of the pillars 35, a center-to-center spacing to the nearest pillar 35 is between 50 nm and 100 nm, inclusive. Spaces between adjacent pillars have, at least at some locations, for example, a lateral extent of at least 5 nm or at least 10 nm and/or of at most 60 nm or at most 40 nm. Preferably, the pillars have a height to width ratio of at least 1.0 or at least 1.5 or at least 2.

The production of the nanostructure 3 is explained in more detail in connection with FIGS. 4A to 4E.

In the exemplary embodiment illustrated in FIG. 1A, an interference layer sequence 4 is arranged between the nanostructure 3 and the substrate 1. For example, the interference layer sequence 4 has an alternating sequence of first layers 41 and second layers 42, wherein the first layers 41 have a comparatively low refractive index and the second layers 42 have a comparatively high refractive index, or vice versa. For example, $SiO_2$ is suitable as a low refractive index layer and $Ta_2O_5$ as a high refractive index layer.

By constructing the interference layer sequence 4 in conjunction with the nanostructure 3, a reflection-reducing layer system 100 can be realized that provides an electrically conductive surface 10 while exhibiting low reflection and high transmission for a given wavelength range.

Figure 1B:
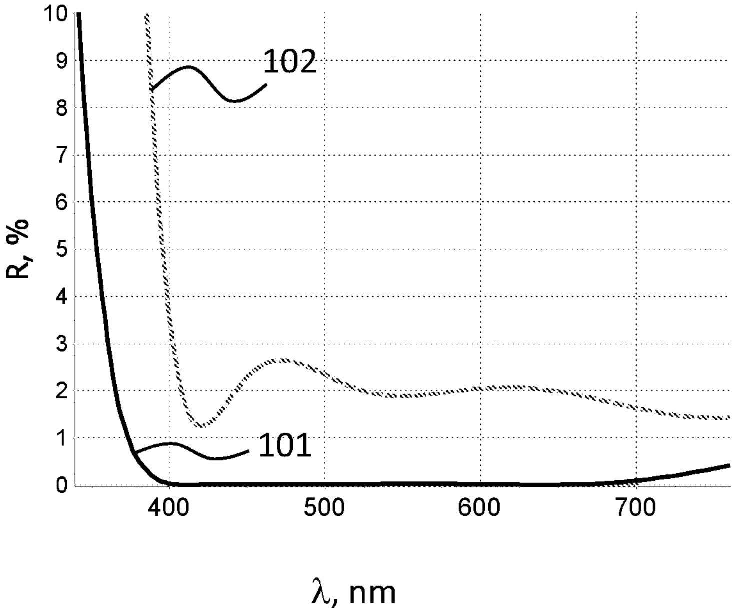
FIG. 1B shows an exemplary curve for reflection as a function of wavelength for an example of a reflection-reducing layer system (curve 101) compared to a layer structure without an electrically conductive nanostructure as the final layer (curve 102)

FIG. 1B illustrates an exemplary embodiment of an achievable reflection optimized for low reflection in the visible spectral range.

The curve 101 is based on a layer structure in which the first layers 41 are formed of $SiO_2$ and the second layers 42 are formed of $Ta_2O_5$. The electrically conductive layer 2 is a 15 nm thick ITO layer. The nanostructure 3 is formed during fabrication from an about 170 nm thick organic layer of melamine, which is converted by plasma etching into a nanostructure having a height of about 90 nm. The layer 32 is an ITO layer with a thickness of 30 nm which is transparent in the visible spectral range and in the near infrared spectral range and conductive. Thus, the pillars 35 of the nanostructure 3 are formed by hollow ITO needles.

The comparison with curve 102 shows that the reflection can be significantly lowered by the nanostructure 3 in the visible spectral range, with the reflection-reducing layer system 100 simultaneously providing an electrically conductive surface 10. Over the entire range from 400 nm to 700 nm, the residual reflection is less than 0.2%. A linear 4-peak measurement of the surface yields a sheet resistance of 300 ohms/square (Ω/□).

Of course, other materials and/or other layer thicknesses can also be used for the layers described. Furthermore, the course of the spectral reflection can be varied within wide limits by suitable selection of the parameters.

Figure 2A:
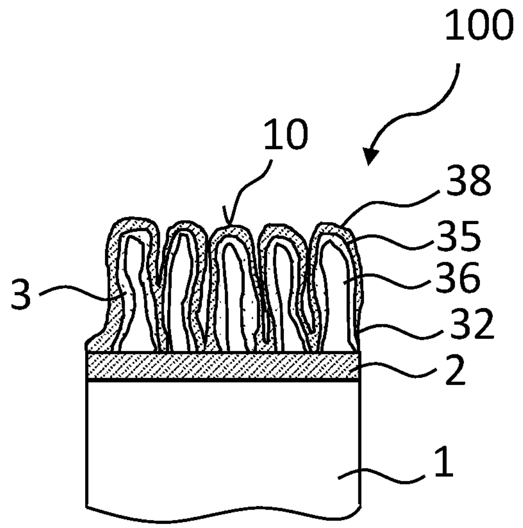
FIG. 2A shows an exemplary embodiment of a reflection-reducing layer system in schematic sectional view.

The exemplary embodiment shown in FIG. 2A is substantially the same as the exemplary embodiment described in connection with FIG. 1A.

In contrast, a cover layer 38 is arranged on the nanostructure 3, which forms the surface 10 of the reflection-reducing layer system 100. The materials described in connection with the electrically conductive layer 2 and the layer 32, for example a TCO material such as ITO, are particularly suitable for the cover layer 38.

The cover layer 38 is electrically conductively connected to the electrically conductive layer 2. In this exemplary embodiment, the layer 32 can be electrically conductive or electrically insulating. Such a cover layer 38 may also be additionally present in the exemplary embodiment according to FIG. 1A.

Furthermore, in this exemplary embodiment, in contrast to the exemplary embodiment shown in FIG. 1A, no interference layer sequence is arranged between the nanostructure 3 and the substrate 1. Only the electrically conductive layer 2 and the nanostructure 3 arranged thereon with the cover layer 38 are located on the substrate 1.

Figure 2B:
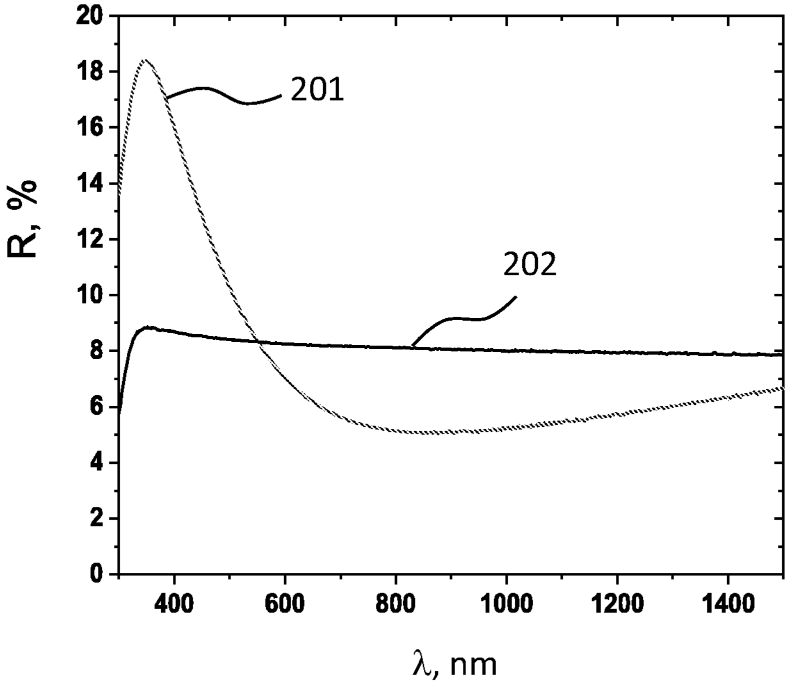
FIG. 2B shows a course of reflection as a function of wavelength for an example of a reflection-reducing layer system (curve 201) in comparison with an uncoated glass substrate (curve 202)

In FIG. 2B, a curve 201 shows a reflection for a reflection-reducing layer structure optimized for the near-infrared spectral range. The curve 201 refers to a reflection-reducing layer system 100 with a nanostructure 3 with a height of approximately 90 nm. The layer 32 is made of a 15 nm thick dielectric material, for example $SiO_2$. The cover layer 38, which forms the surface 10 of the reflection-reducing layer system 100, has a thickness of 15 nm.

Figure 2C:
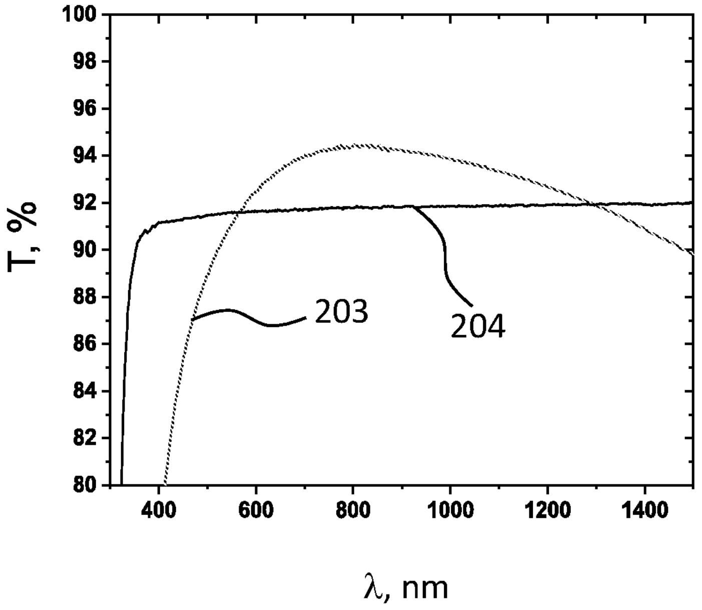
FIG. 2C shows a course of transmission as a function of wavelength for an example of a reflection-reducing layer system (curve 203) in comparison with an uncoated glass substrate (curve 204)

The resulting reflection is lower than for an uncoated glass substrate (curve 202) in the entire wavelength range from about 600 nm to 1500 nm. At the same time, as FIG. 2C shows, the transmission (curve 203) is increased compared to an uncoated glass substrate (curve 204) in a wavelength range from about 600 nm to 1300 nm. Thus, an electrically conductive surface is obtained while simultaneously achieving low residual reflection and high transmission for the target wavelength range.

The high transmission is achieved in particular due to a particularly low effective refractive index of the electrically conductive nanostructure 3 of at most 1.4 or at most 1.3. For example, the effective refractive index of the nanostructure 3 is between 1.2 and 1.4 inclusive.

Figure 3A:
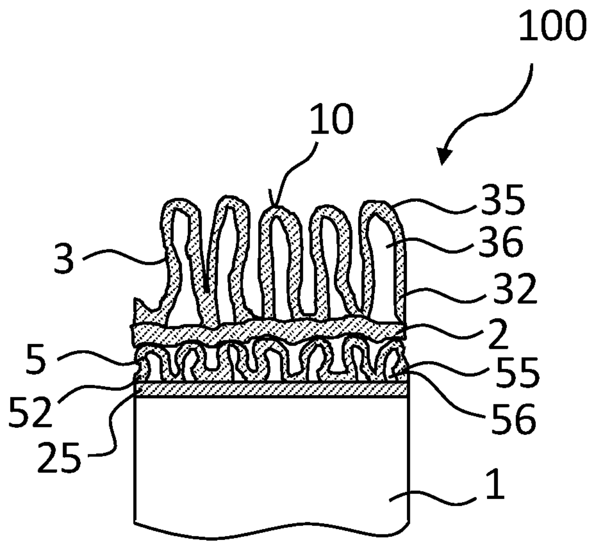
FIG. 3A shows an exemplary embodiment of a reflection-reducing layer system in schematic sectional view.

The exemplary embodiment shown in FIG. 3A is substantially the same as the exemplary embodiment described in connection with FIG. 1A.

In contrast, a further nanostructure 5 is arranged between the nanostructure 3 and the substrate 1 instead of an interference layer sequence. The electrically conductive layer 2 is located between the further nanostructure 5 and the nanostructure 3. A further conductive layer 25 is arranged between the further nanostructure 5 and the substrate 1. The further nanostructure 5 and the further electrically conductive layer 25 can be formed similarly to the nanostructure 3 and electrically conductive layer 2, respectively. However, the nanostructure 3 and the further nanostructure 5 may differ from each other, for example, with respect to the effective refractive index, for example, due to a different structuring, for example, with respect to the height in the vertical direction or the extension in the lateral direction, and/or due to different materials. The further nanostructure 5 has further pillars 55 with cavities 56 similar to the nanostructure 3.

Figure 3B:
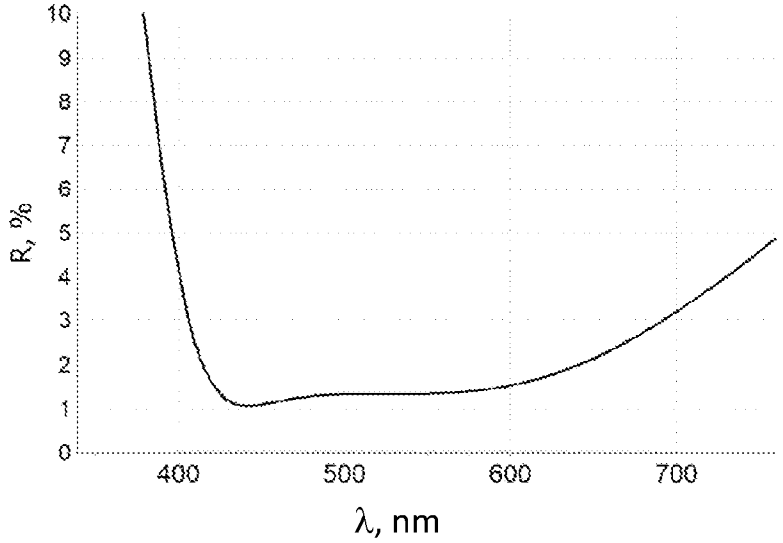
FIG. 3B shows an exemplary embodiment for a course of the reflection as a function of the wavelength for the exemplary embodiment shown in FIG. 3A.

In the case that all layers arranged on the substrate 1 are formed by ITO, FIG. 3B shows an example of the course of the reflection as a function of the wavelength. Over the entire visible spectral range, the reflection is below 4%, which would correspond to the reflection of an uncoated glass substrate. For the reflection-reducing layer structure with the nanostructure 3 and the further nanostructure 5, the sheet resistance is less than 40 Ohm/square.

FIGS. 4A to 4D illustrate an exemplary embodiment for a method for producing a reflection-reducing layer system by means of schematically illustrated intermediate steps.

Figure 4A:
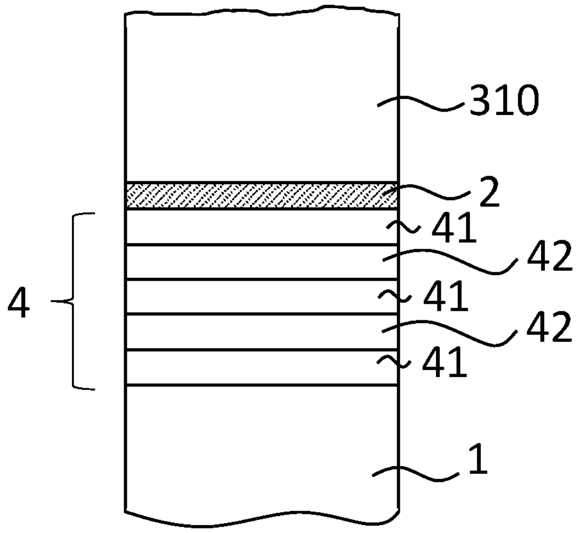
FIGS. 4A to 4D show an exemplary embodiment of a method for the production of a reflection-reducing layer system by means of intermediate steps shown in schematic sectional view in each case.

As shown in FIG. 4A, an initial layer 310 for a nanostructured layer is deposited. The nanostructured layer 31 preferably has an organic material, but may also contain inorganic components as long as the material for the nanostructured layer 31 is easier to structure by a plasma etching process than the underlying material, in the shown exemplary embodiment the electrically conductive layer 2. Between the substrate 1 and the electrically conductive layer 2 there is an optional interference layer sequence 4 as shown in FIG. 1A.

Figure 4B:
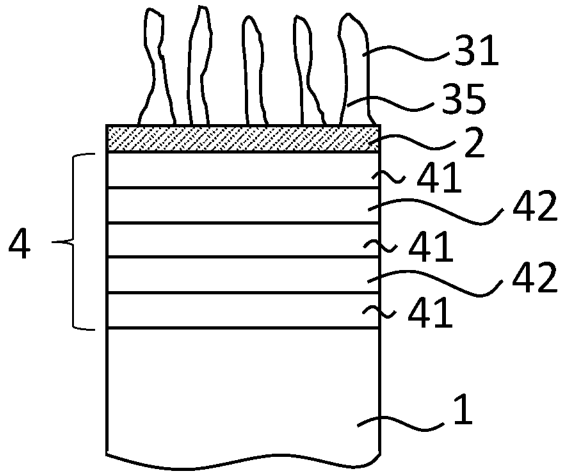

As illustrated in FIG. 4B, the initial layer 310 is patterned into the nanostructured layer 31 by a plasma process so as to form a plurality of pillars 35 spaced apart from each other and arranged side by side in the lateral direction. The pillars 35 extend predominantly perpendicularly or at least substantially perpendicularly, for example in an angular range of 70° to 110°, to a main surface of the substrate 1 to be coated. Between the pillars 35, the electrically conductive layer 2 is exposed at least in places. The nanostructured layer 31 has, for example, a thickness between 40 nm and 250 nm inclusive. For example, a nanostructure with a height of 90 nm can be produced by plasma etching a 170 nm thick layer of melamine by plasma etching with oxygen in the pressure range of 0.1-0.4*10-4 mbar within 200 to Boos.

Figure 4C:
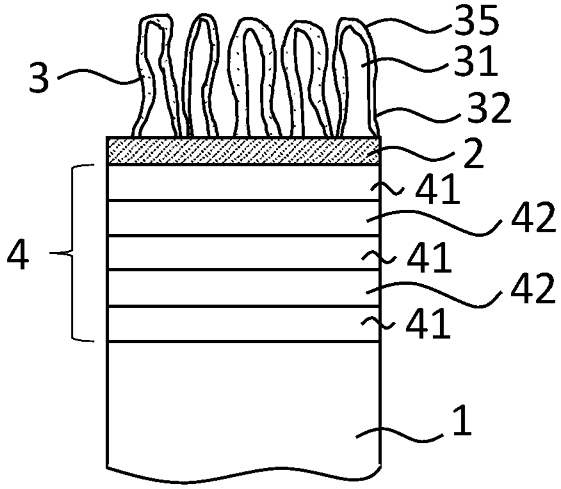

As illustrated in FIG. 4C, the pillars 35 are overlaid with a layer 32. Here, the layer 32 replicates the pillars 35 of the nanostructured layer 31 at least in places. The layer 32 is an inorganic or at least partially inorganic layer. In the case that the layer 32 is the uppermost layer of the layer system to be produced and thus forms the surface 10 of the finished layer system (cf. FIG. 4D), the layer 32 is electrically conductive. In particular, the layer 32 is a layer comprising a TCO material. Alternatively, a further layer, for example in the form of a cover layer, can optionally be applied to the layer 32. In this case, which is described with reference to FIG. 4E, the layer 32 can be electrically conductive or electrically insulating.

Figure 4D:
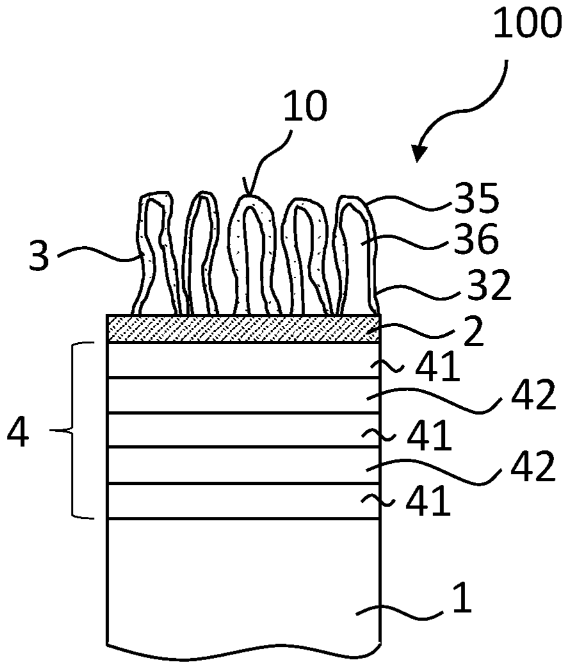

After overlaying with layer 32 as shown in FIG. 4C, a post-treatment is carried out, as illustrated in FIG. 4D, in which the nanostructured layer 31 is decomposed or removed at least in places. This results in an inorganic-organic hybrid material. Preferably, the organic components are completely removed during the post-treatment. In contrast to the structuring in the intermediate step shown in FIG. 4B, the geometry of the nanostructured layer 3 with the pillars 35 is largely retained. In particular, the height-to-width ratio of the pillars 35 does not change or does not change significantly.

The post-treatment creates cavities 36 in the pillars 35. By means of the cavities 36, the nanostructure 3 has a particularly low effective refractive index.

The post-treatment can be achieved by a plasma etching process. In this case, the layer to be processed, i.e. the nanostructured layer 31, is covered by an overlying layer, i.e. layer 32, in contrast to the intermediate step shown in FIG. 4B. Alternatively or in addition to a post-treatment with a plasma etching process, a thermal treatment, for example at a temperature of at least 70° C., can also be carried out as a post-treatment.

With the described method, the nanostructure 3 can be produced with precisely adjustable and reproducible properties, in particular with regard to the height of the nanostructure 3 and its effective refractive index. This allows the nanostructure 3 to be efficiently combined with the interference layer sequence 4, for example.

Preferably, the same plasma source is always used for all plasma processes. For example, a plasma source of the APS type is suitable, such as a coating system of the SyrusPro series from the manufacturer Bühler Leybold Optics with an ion energy of 80-150 eV.

In particular, at least the steps in which coating of the substrate 1 takes place can be carried out in a plant in a closed vacuum process. The production of the layer system can thus be carried out particularly efficiently. In particular, all steps in which a deposition, structuring or post-treatment is carried out can also be carried out in one plant.

The reflection reducing layer system 100 shown in FIG. 4D corresponds to the embodiment described in connection with FIGS. 1A and 1B, in which the layer 32 is electrically conductive and forms the surface 10 of the manufactured layer system 1.

Figure 4E:
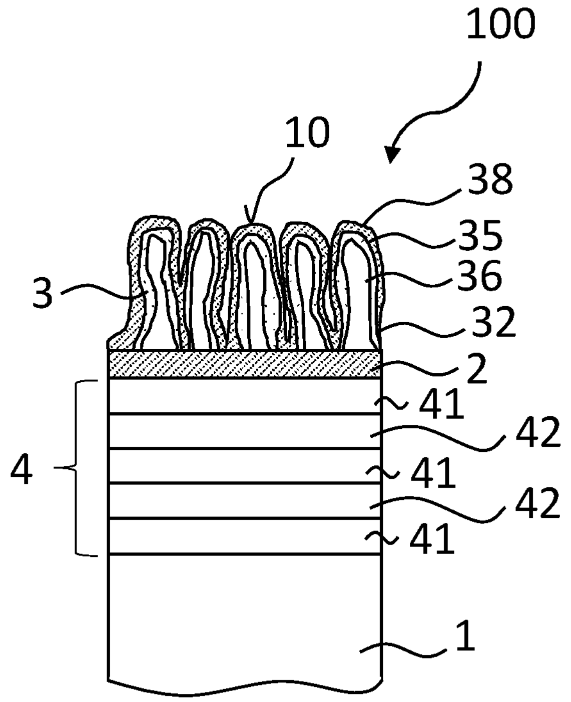
FIG. 4E shows an example of an optional manufacturing step following FIG. 4D for producing a reflection-reducing layer system according to a further exemplary embodiment.

Alternatively, as in FIG. 4E, a cover layer 38 can be applied to the layer 32 so that the cover layer 38 forms the surface 10 in the finished reflection-reducing layer system 100. The materials described in connection with the electrically conductive layer 2 are particularly suitable for the cover layer 38. In this exemplary embodiment, the layer 32 may also be electrically conductive or electrically insulating. For example, in the latter case, the layer 32 is a dielectric layer comprising, for example, silicon oxide.

Thus, in this exemplary embodiment, a portion of the material is applied over the cavities 36 prior to post-treatment, namely the layer 32, while another portion of the material, namely the cover layer 38, is applied after the post-treatment.

By means of the cover layer 38, the material thickness over the cavities 36 of the nanostructure can be increased. Since the cover layer 38 is applied after the post-treatment, the thickness of the cover layer 38, in particular in contrast to the thickness of the layer 32, has no influence on the method step of the post-treatment. Such a two-step application may therefore also be favorable in the case where the layer 32 and the cover layer 38 are made of the same material. However, the materials may also be different from each other.

In the spaces between the pillars 35, the cover layer 38 is electrically conductively connected to the electrically conductive layer 2. This can take place directly via direct contact between the layers or indirectly via layer 32.

The reflection-reducing layer system 100 shown in FIG. 4E is largely similar to the exemplary embodiment described in connection with FIGS. 2A and 2B, in which the cover layer 38 is electrically conductive and forms the surface 10 of the produced layer system 1. However, in contrast to FIG. 2A, an optional interference layer sequence 4 is arranged between the substrate 1 and the nanostructure 3.

With reference to FIGS. 5A to 5H, an exemplary production method is described in which a reflection-reducing layer structure with stacked nanostructures is produced, as shown for example in FIG. 3A.

Figure 5A:
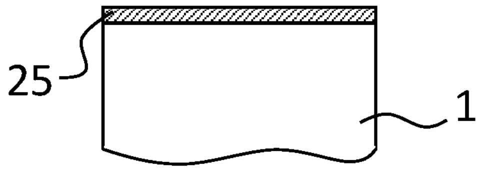
FIGS. 5A to 5H show an exemplary embodiment of a method for producing a reflection-reducing layer system by means of intermediate steps each shown in schematic sectional view.
Figure 5B:
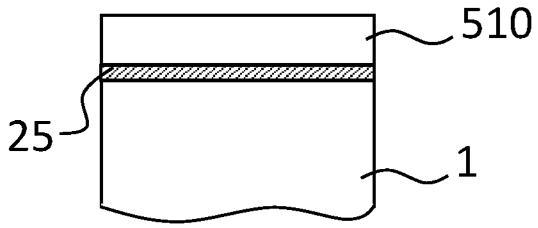
Figure 5C:
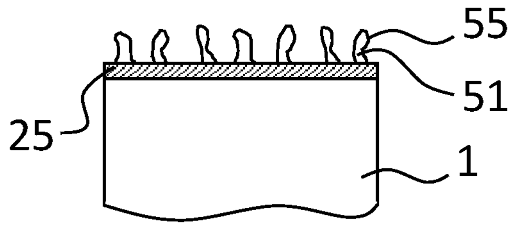

A further electrically conductive layer is applied to a substrate 1 (FIG. 5A). Subsequently, as shown in FIG. 1B, a further initial layer 510 is applied. This further initial layer is structured by a plasma etching process as described in connection with FIG. 4B, so that a plurality of further pillars 55 is formed (FIG. 5C).

Figure 5D:
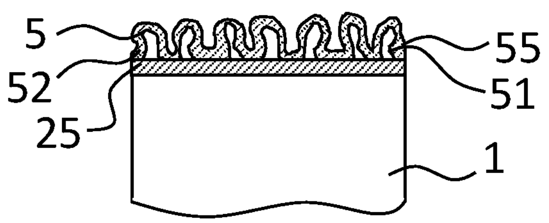
Figure 5E:
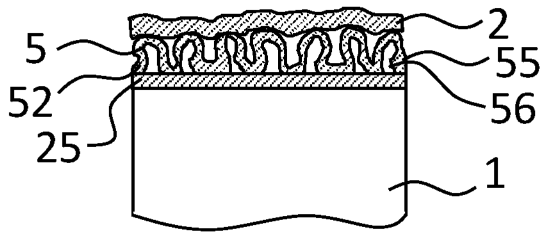

The further nanostructured layer 51 is overlaid with a further layer 52 (FIG. 5D).

Subsequently, as described in connection with FIG. 5D, the organic portions of the further nanostructured layer 51 are decomposed or removed. Subsequently, an electrically conductive layer 2 is applied. In the spaces between the further pillars 55 with the further cavities 56, free spaces can be formed in which no material of the electrically conductive layer 2 is present.

Figure 5F:
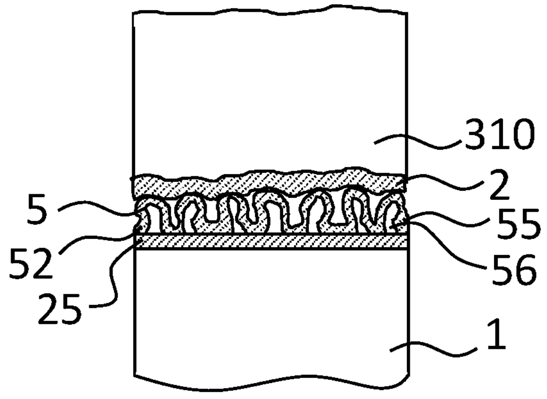
Figure 5G:
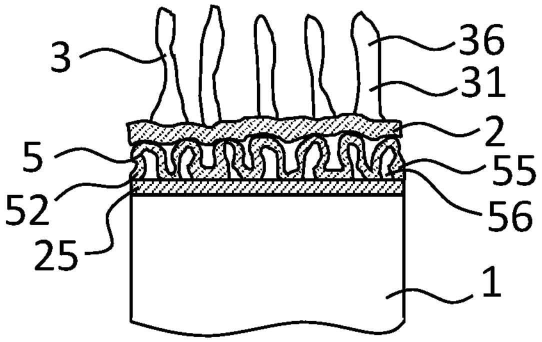
Figure 5H:
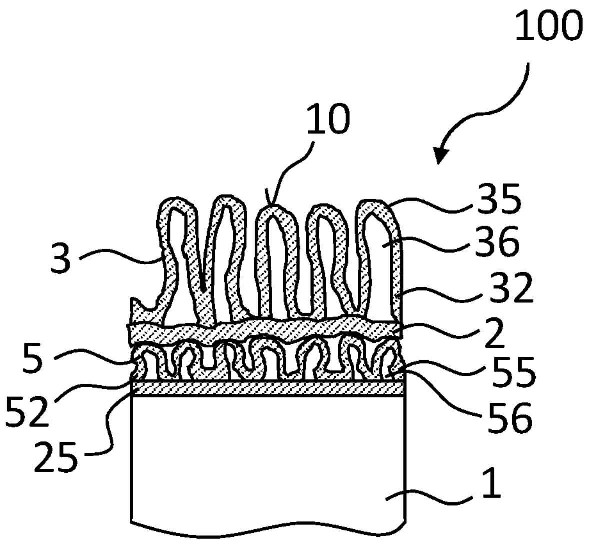
Figure 6A:
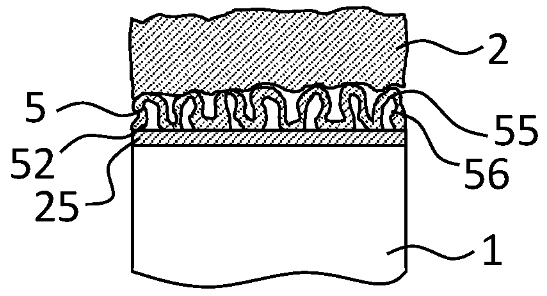
FIGS. 6A to 6D show an exemplary embodiment of a method for producing a reflection-reducing layer system by means of intermediate steps shown in schematic sectional view in each case.
Figure 6B:
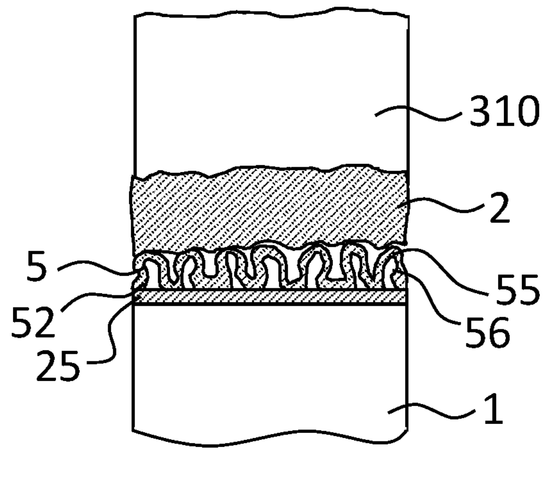
Figure 6C:
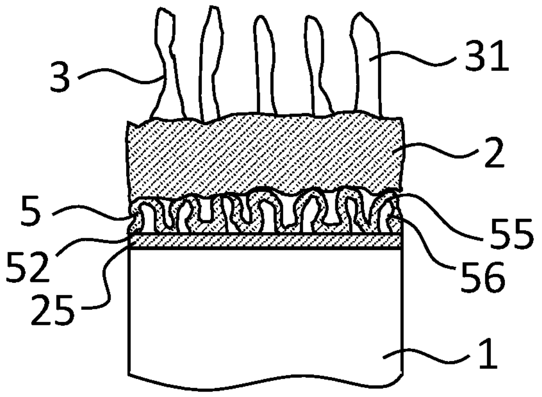
Figure 6D:
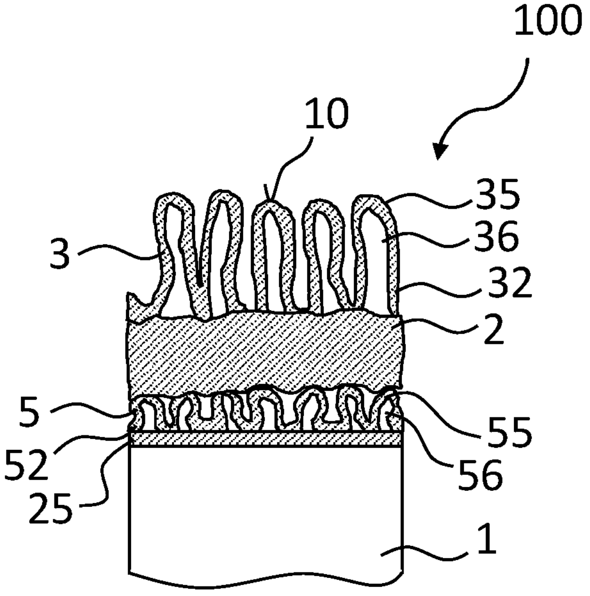

The deposition of the initial layer 310 in FIG. 5F, the formation of the nanostructured layer 31 in FIG. 5G, the overlaying of the nanostructured layer 31 and the post-treatment to form the cavities 36 in FIG. 5H can be performed as described in connection with FIGS. 4A to 4D.

The method produces a reflection-reducing layer system 100 with two nanostructures stacked on top of each other. These nanostructures each form an effective refractive index which is small compared to the effective refractive index of the electrically conductive layer 2 and the further electrically conductive layer 25. Here, the entire layer sequence formed on the substrate 1 can be electrically conductive, so that particularly low sheet resistances can result.

The exemplary embodiment for a method illustrated in FIGS. 6A to 6D is substantially the same as the exemplary embodiment described in connection with FIGS. 5A to 5H. In particular, the method steps prior to deposition of the electrically conductive layer 2 can be carried out analogously to the previous exemplary embodiment. In contrast to the previous exemplary embodiment, the thickness of the electrically conductive layer 2 is increased and can, for example, also be greater than the thickness of the further nanostructure 5. The thickness of the electrically conductive layer 2 can be optimized in particular with regard to the lowest possible residual reflection. The further method steps, in particular the steps for forming the nanostructures 3, 5, are largely independent of the thickness of the electrically conductive layer 2. The further intermediate steps shown in FIGS. 6B to 6D can be carried out analogously to the steps described in connection with FIGS. 5F to 5H.

The invention is not limited by the description based on the exemplary embodiments. Rather, the invention encompasses any new feature as well as any combination of features, which in particular includes any combination of features in the claims, even if this feature or combination itself is not explicitly stated in the claims or the exemplary embodiments.

What is claimed is:

1. A reflection-reducing layer system arranged on a substrate, wherein a surface of the reflection-reducing layer system facing away from the substrate is electrically conductive, wherein a nanostructure comprising a plurality of pillars arranged side by side is arranged between the substrate and the surface, wherein at least some of the pillars have completely enclosed cavities, and wherein the surface is formed by a layer comprising transparent conductive oxide (TCO).

2. The reflection-reducing layer system according to claim 1, wherein an electrically conductive layer is arranged between the substrate and the nanostructure.

3. The reflection-reducing layer system according to claim 2, wherein the electrically conductive layer is electrically conductively connected to the surface of the reflection-reducing layer system.

4. The reflection-reducing layer system according to claim 1, wherein the pillars are stochastically randomly distributed over the substrate, and wherein, at least for some pillars, a center-to-center distance to a closest pillar is between 50 nm and 100 nm, inclusive.

5. The reflection-reducing layer system according to claim 1, wherein the pillars have a height-to-width ratio of at least 1.0.

6. The reflection-reducing layer system according to claim 1, wherein the nanostructure has an effective refractive index of at most 1.6.

7. The reflection-reducing layer system according to claim 1, wherein a further nanostructure is arranged between the substrate and the nanostructure.

8. The reflection-reducing layer system according to claim 1, wherein an interference layer sequence is arranged between the substrate and the nanostructure.

9. A method comprising:

providing a substrate; and forming a nanostructure with a plurality of pillars arranged side by side on the substrate, wherein a surface of a formed layer system facing away from the substrate is electrically conductive, wherein the formed layer system is reflection-reducing, wherein at least some of the pillars have completely enclosed cavities, and wherein the surface is formed by a layer comprising transparent conductive oxide (TCO).

10. The method according to claim 9, wherein forming the nanostructure comprises:

forming a nanostructured layer on the substrate;

overlaying the nanostructured layer with a layer; and performing a post-treatment in which the nanostructured layer is decomposed or removed at least in places.

11. The method of claim 10, wherein the nanostructured layer comprises an organic or partially organic material.

12. The method according to claim 10, wherein the layer is electrically conductive.

13. The method according to claim 10, further comprising applying an electrically conductive cover layer after the post-treatment, the electrically conductive cover layer forming the electrically conductive surface of the formed layer system.

14. A system comprising:

a substrate; and a layer system arranged on the substrate and configured to reduce optical reflection, wherein a surface of the layer system facing away from the substrate is electrically conductive, wherein a nanostructure of the layer system comprises a plurality of pillars arranged side by side and is arranged between the substrate and the surface, wherein at least some of the pillars have completely enclosed cavities, and wherein the surface is formed by a layer comprising transparent conductive oxide (TCO).

* * * * *